United States Patent
Govil

(10) Patent No.: US 8,847,862 B2
(45) Date of Patent: Sep. 30, 2014

(54) SYSTEMS, DEVICES, AND METHODS FOR DRIVING AN INTERFEROMETRIC MODULATOR

(75) Inventor: Alok Govil, Santa Clara, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 257 days.

(21) Appl. No.: 13/306,133

(22) Filed: Nov. 29, 2011

(65) Prior Publication Data

US 2013/0135326 A1     May 30, 2013

(51) Int. Cl.
*G09G 3/34*     (2006.01)

(52) U.S. Cl.
USPC .............. 345/85; 345/108; 359/245; 359/290

(58) Field of Classification Search
CPC ........... G09F 9/372; G09F 9/302; G09F 3/02; G09F 9/375; G09F 9/33; G09F 9/37; G09F 19/16
USPC ............................. 345/85, 108; 359/245, 290
See application file for complete search history.

(56) References Cited

U.S. PATENT DOCUMENTS

| | | | |
|---|---|---|---|
| 4,954,789 A | 9/1990 | Sampsell | |
| 5,784,189 A | 7/1998 | Bozler et al. | |
| 6,040,937 A | 3/2000 | Miles | |
| 6,574,033 B1 | 6/2003 | Chui et al. | |
| 6,674,562 B1 | 1/2004 | Miles et al. | |
| 7,042,643 B2 | 5/2006 | Miles | |
| 7,074,700 B2 | 7/2006 | Huang et al. | |
| 7,123,216 B1 | 10/2006 | Miles | |
| 7,158,281 B2 | 1/2007 | Chen et al. | |
| 7,327,510 B2 | 2/2008 | Cummings et al. | |
| 7,560,299 B2 | 7/2009 | Cummings | |
| 7,889,163 B2 | 2/2011 | Chui et al. | |
| 7,990,604 B2 | 8/2011 | Lee et al. | |
| 2004/0008396 A1 | 1/2004 | Stappaerts | |
| 2005/0076714 A1 | 4/2005 | Sakai et al. | |
| 2005/0151714 A1 | 7/2005 | Hirama | |
| 2005/0210980 A1 | 9/2005 | Umemura et al. | |
| 2005/0263838 A1 | 12/2005 | Sakai | |
| 2006/0209012 A1 | 9/2006 | Hagood, IV | |
| 2007/0046950 A1 | 3/2007 | Brown et al. | |

(Continued)

FOREIGN PATENT DOCUMENTS

| | | |
|---|---|---|
| EP | 1564710 A2 | 8/2005 |
| WO | 2006036386 A1 | 4/2006 |
| WO | 2011133337 A1 | 10/2011 |

OTHER PUBLICATIONS

Anderson, Dec. 2004, Design and fabrication of a MEMS micromirror with integrated charge sensor for feedback control, A Thesis in Mechanical Engineering, Texas Tech University, 110 pp.

(Continued)

*Primary Examiner* — Kevin M Nguyen
(74) *Attorney, Agent, or Firm* — Knobbe Martens Olson & Bear LLP

(57) ABSTRACT

This disclosure provides systems, methods, and apparatus for controlling the actuation of an analog interferometric modulator. In one aspect, a voltage may be determined from a sense electrode. A distance between one or more of the electrodes may be determined based on the voltage. The sense electrode may be capacitively coupled to another electrode, and may be implemented in a mirror of a movable layer of an interferometric modulator, or may be implemented in a floating fixed layer of an interferometric modulator.

18 Claims, 16 Drawing Sheets

(56) References Cited

U.S. PATENT DOCUMENTS

| | | |
|---|---|---|
| 2007/0075942 A1 | 4/2007 | Martin et al. |
| 2007/0296691 A1 | 12/2007 | Sampsell |
| 2008/0180516 A1 | 7/2008 | Yang et al. |
| 2009/0095080 A1 | 4/2009 | Sasaki et al. |
| 2009/0201242 A1 | 8/2009 | Govil |
| 2009/0204349 A1 | 8/2009 | Govil et al. |
| 2009/0207159 A1 | 8/2009 | Govil |
| 2009/0243975 A1 | 10/2009 | Pakhchyan et al. |
| 2009/0303403 A1 | 12/2009 | Park et al. |
| 2010/0245313 A1 | 9/2010 | Lewis et al. |
| 2010/0315696 A1 | 12/2010 | Lee et al. |
| 2011/0075245 A1 | 3/2011 | Hashimura et al. |
| 2011/0176196 A1 | 7/2011 | Govil et al. |
| 2012/0223683 A1 | 9/2012 | Derichs |
| 2013/0135324 A1 | 5/2013 | Hong et al. |
| 2013/0135325 A1 | 5/2013 | Govil |

OTHER PUBLICATIONS

Anderson et al., May 2005, Integrated charge and position sensing for feedback control of electrostatic MEMS, Proceedings of the SPIE, 5765:42-53.

International Search Report and Written Opinion—PCT/US2012/065539—ISA/EPO—Mar. 6, 2013.

SYSTEMS, DEVICES, AND METHODS FOR DRIVING AN INTERFEROMETRIC MODULATOR

TECHNICAL FIELD

This disclosure relates to driving schemes and calibration methods for analog interferometric modulators, and for detecting the position of a movable conductor disposed between two other conductors.

DESCRIPTION OF RELATED TECHNOLOGY

Electromechanical systems (EMS) include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nano-electromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of EMS device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

SUMMARY

The system, method, and devices of the invention each have several aspects, no single one of which is solely responsible for its desirable attributes disclosed herein.

One innovative aspect of the subject matter described in this disclosure can be implemented in a device for modulating light. In this aspect, the device includes a first electrode coupled to a first voltage source, a second electrode, and a movable electrode disposed between and spaced apart from the first electrode and the second electrode. The movable electrode may include a third electrode and a fourth electrode, the third electrode and the fourth electrode being capacitively coupled, the third electrode and the fourth electrode being positioned in two different parallel planes separated by a gap. A voltage sensor may be coupled to the third electrode, and a second voltage source may be coupled to the fourth electrode.

The second electrode may be coupled to a third voltage source. In some aspects, the voltage sensor provides feedback for the second voltage source.

In another innovative aspect, a method of driving a device for modulating light includes applying a first voltage across a first electrode and a second electrode, and applying a second voltage to a third electrode in a first plane configured as a portion of a movable electrode. The movable electrode may be disposed between and spaced apart from the first electrode and the second electrode and may further include a fourth electrode capacitively coupled to the third electrode that is positioned in a second different and parallel plane as the third electrode and separated from the third electrode by a gap. The method may include sensing a voltage of the fourth electrode.

In another innovative aspect, a device for modulating light includes means for applying a first voltage across a first electrode and a second electrode and means for applying a second voltage to a third electrode in a first plane configured as a portion of a movable electrode. The movable electrode may be disposed between and spaced apart from the first electrode and the second electrode and may further include a fourth electrode capacitively coupled to the third electrode that is positioned in a second different and parallel plane as the third electrode and separated from the third electrode by a gap. The device may further include means for sensing a voltage of the fourth electrode.

In another innovative aspect, a device for modulating light includes a first electrode coupled to a first voltage source, a second electrode coupled to a capacitor, and a movable electrode disposed between and spaced apart from the first electrode and the second electrode, the movable electrode including a third electrode. A voltage sensor may be coupled to the second electrode, and a second voltage source may be coupled to the movable electrode.

In another innovative aspect, a method of driving a device for modulating light includes applying a first voltage to a first electrode, applying a second voltage to a movable electrode positioned between the first electrode and a second electrode, wherein the second electrode is coupled to a capacitor, and sensing a voltage of the second electrode.

In another innovative aspect, a device for modulating light includes means for applying a first voltage to a first electrode and means for applying a second voltage to a movable electrode positioned between the first electrode and a second electrode, wherein the second electrode is coupled to a capacitor. The device may further include means for sensing a voltage of the second electrode.

Details of one or more implementations of the subject matter described in this specification are set forth in the accompanying drawings and the description below. Although the examples provided in this disclosure are primarily described in terms of electromechanical systems (EMS) and microelectromechanical systems (MEMS)-based displays, the concepts provided herein may apply to other types of displays, such as liquid crystal displays, organic light-emitting diode ("OLED") displays and field emission displays. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
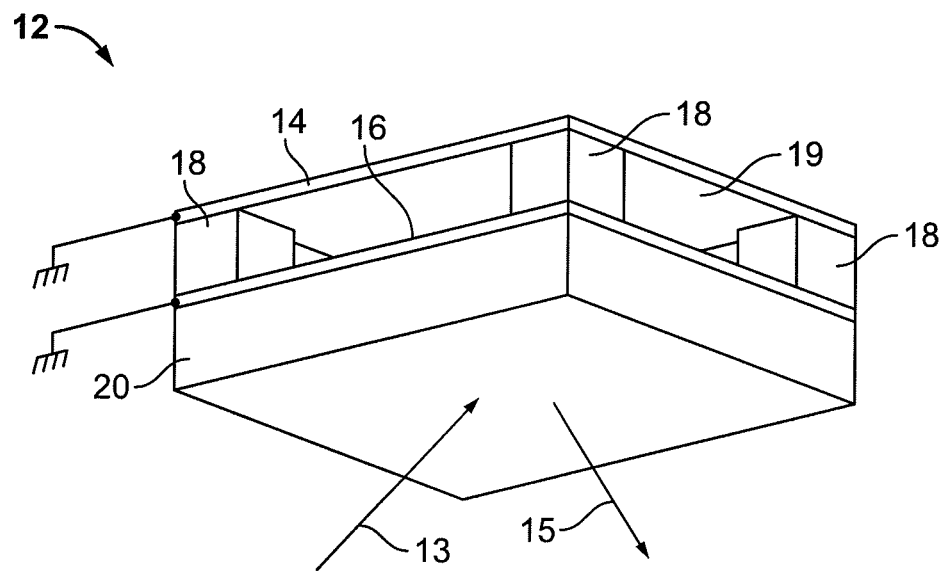
FIGS. 1A and 1B show examples of isometric views depicting a pixel of an interferometric modulator (IMOD) display device in two different states.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to display an image, whether in motion (e.g., video) or stationary (e.g., still image), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (i.e., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS), microelectromechanical systems (MEMS) and non-MEMS applications), aesthetic structures (e.g., display of images on a piece of jewelry) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Certain methods and devices described herein relate to driving an interferometric modulator with increased accuracy. Pixel-level calibration may be performed with respect to each interferometric modulator such that a gap distance of the interferometric modulator may be precisely controlled, regardless of aging or production characteristics. In some implementations, a movable layer is positioned between two fixed layers. The movable layer may include two electrodes in different planes separated by a gap. Voltage is sensed on one of the layers to determine a position of the movable layer between the two fixed layers. In other implementations, one of the fixed layers is coupled to a fixed capacitor. Voltage is sensed on this fixed layer to determine a position of the movable layer.

Particular implementations of the subject matter described in this disclosure can be implemented to realize one or more of the following potential advantages. The systems and methods disclosed herein can allow fast and accurate modulator positioning and increase the ability to produce a high performance array of modulators in a display device even when the physical properties of the modulators of the array include performance differences related to fabrication tolerances. Further, such systems can be produced with little or no added complexity, and with little or no loss of fill factor.

An example of a suitable EMS or MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity. One way of changing the optical resonant cavity is by changing the position of the reflector.

Figure 1B:
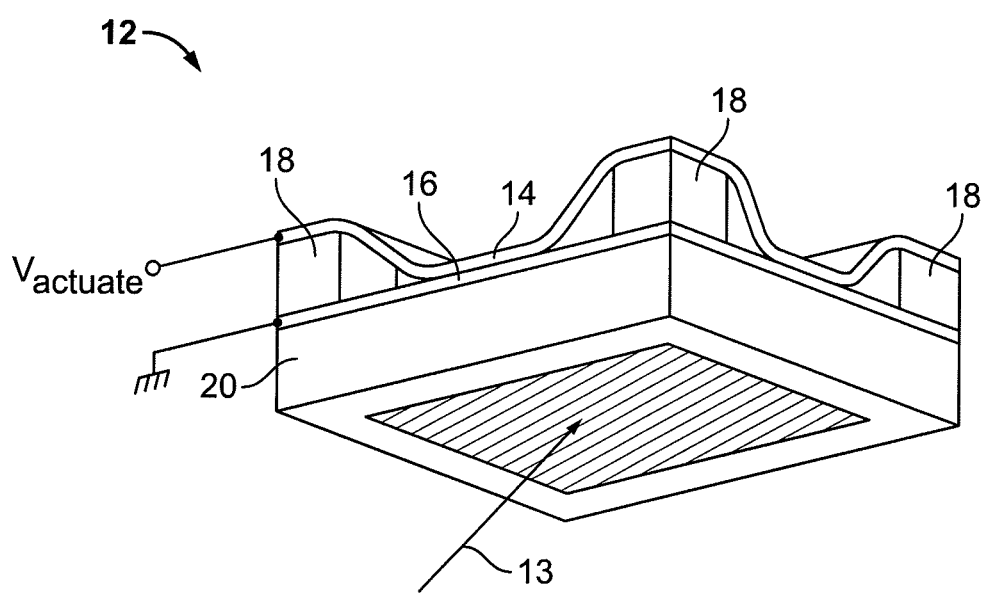

FIGS. 1A and 1B show examples of isometric views depicting a pixel of an interferometric modulator (IMOD) display device in two different states. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, absorbing and/or destructively interfering light within the visible range. In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted pixels in FIGS. 1A and 1B depict two different states of an IMOD 12. In the IMOD 12 of FIG. 1A, a movable reflective layer 14 is illustrated in a relaxed position at a predetermined distance from an optical stack 16, which includes a partially reflective layer. Since no voltage is applied across the IMOD 12 in FIG. 1A, the movable reflective layer 14 remained in a relaxed or unactuated state. In the IMOD 12 of FIG. 1B, the movable reflective layer 14 is illustrated in an actuated position adjacent to the optical stack 16. The voltage $V_{actuate}$ applied across the IMOD 12 in FIG. 1B is sufficient to actuate the movable reflective layer 14 to an actuated position.

In FIG. 1, the reflective properties of pixels 12 are generally illustrated with arrows 13 indicating light incident upon the pixels 12, and light 15 reflecting from the pixel 12 on the left. A person having ordinary skill in the art will readily recognize that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixels 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, such as chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, electrically more conductive layers or portions (e.g., of the optical stack 16 or of other structures of the IMOD) can serve to bus signals between IMOD pixels. The optical stack 16 also can include one or more insulating or dielectric layers covering one or more conductive layers or an electrically conductive/optically absorptive layer.

In some implementations, the lower electrode 16 is grounded at each pixel. In some implementations, this may be accomplished by depositing a continuous optical stack 16 onto the substrate and grounding the entire sheet at the periphery of the deposited layers. In some implementations, a highly conductive and reflective material, such as aluminum (Al), may be used for the movable reflective layer 14. The movable reflective layer 14 may be formed as a metal layer or layers deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be approximately less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14a remains in a mechanically relaxed state, as illustrated by the pixel 12 in FIG. 1A, with the gap 19 between the movable reflective layer 14 and optical stack 16. However, when a potential difference, e.g., voltage, is applied to at least one of the movable reflective layer 14 and optical stack 16, the capacitor formed at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 in FIG. 1B. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

In some implementations, the optical stacks 16 in a series or array of IMODs can serve as a common electrode that provides a common voltage to one side of the IMODs of the display device. The movable reflective layers 14 may be formed as an array of separate plates arranged in, for example, a matrix form, as described further below. The separate plates can be supplied with voltage signals for driving the IMODs.

Figure 3:
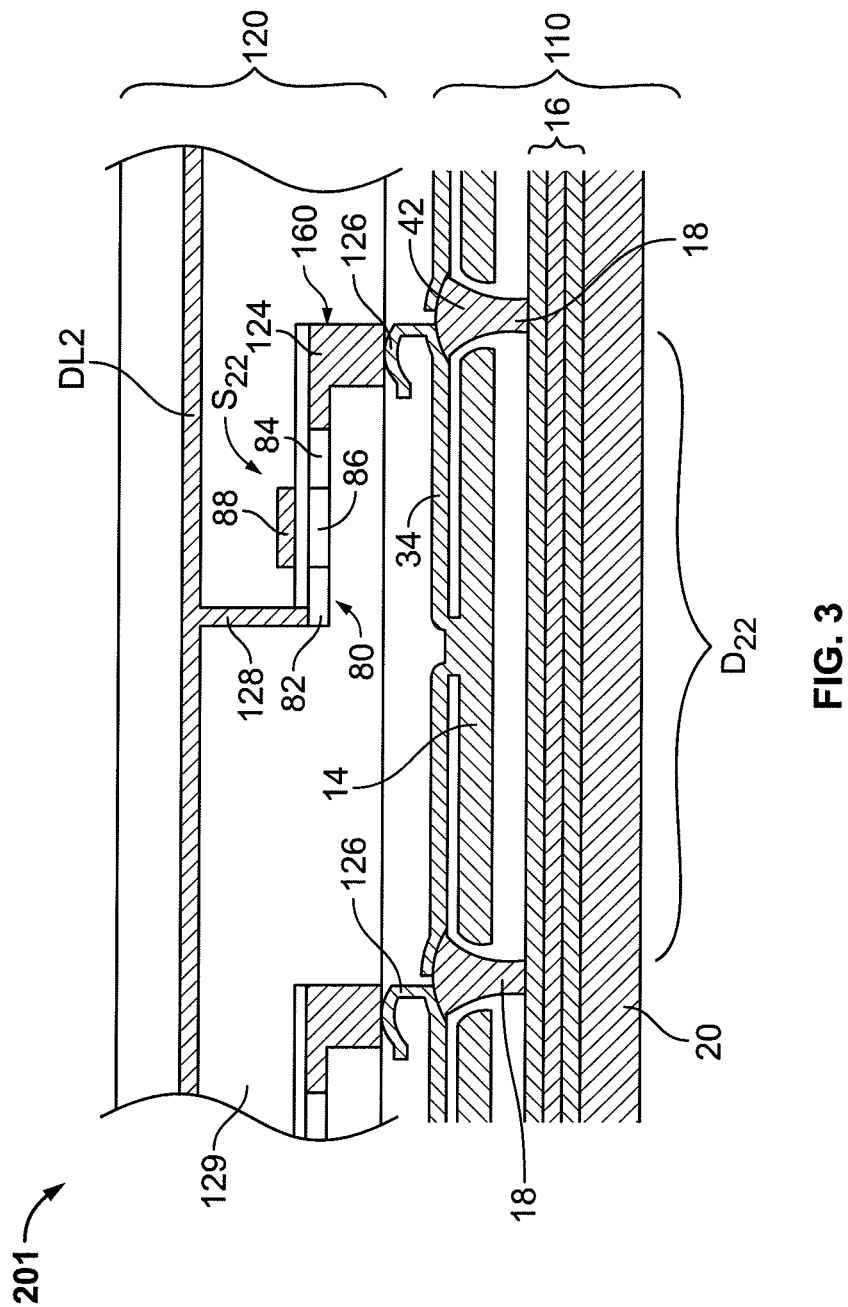
FIG. 3 shows an example of a schematic partial cross-section illustrating one implementation of the structure of the driving circuit and the associated display element of FIG. 2.

The details of the structure of interferometric modulators that operate in accordance with the principles set forth above may vary widely. For example, the movable reflective layers 14 of each IMOD may be attached to supports at the corners only, e.g., on tethers. As shown in FIG. 3, a flat, relatively rigid reflective layer 14 may be suspended from a deformable layer 34, which may be formed from a flexible metal. This architecture allows the structural design and materials used for the electromechanical aspects and the optical aspects of the modulator to be selected, and to function, independently of each other. Thus, the structural design and materials used for the reflective layer 14 can be optimized with respect to the optical properties, and the structural design and materials used for the deformable layer 34 can be optimized with respect to desired mechanical properties. For example, the reflective layer 14 portion may be aluminum, and the deformable layer 34 portion may be nickel. The deformable layer 34 may connect, directly or indirectly, to the substrate 20 around the perimeter of the deformable layer 34. These connections may form the support posts 18.

In implementations such as those shown in FIGS. 1A and 1B, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 3) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing.

Figure 2:
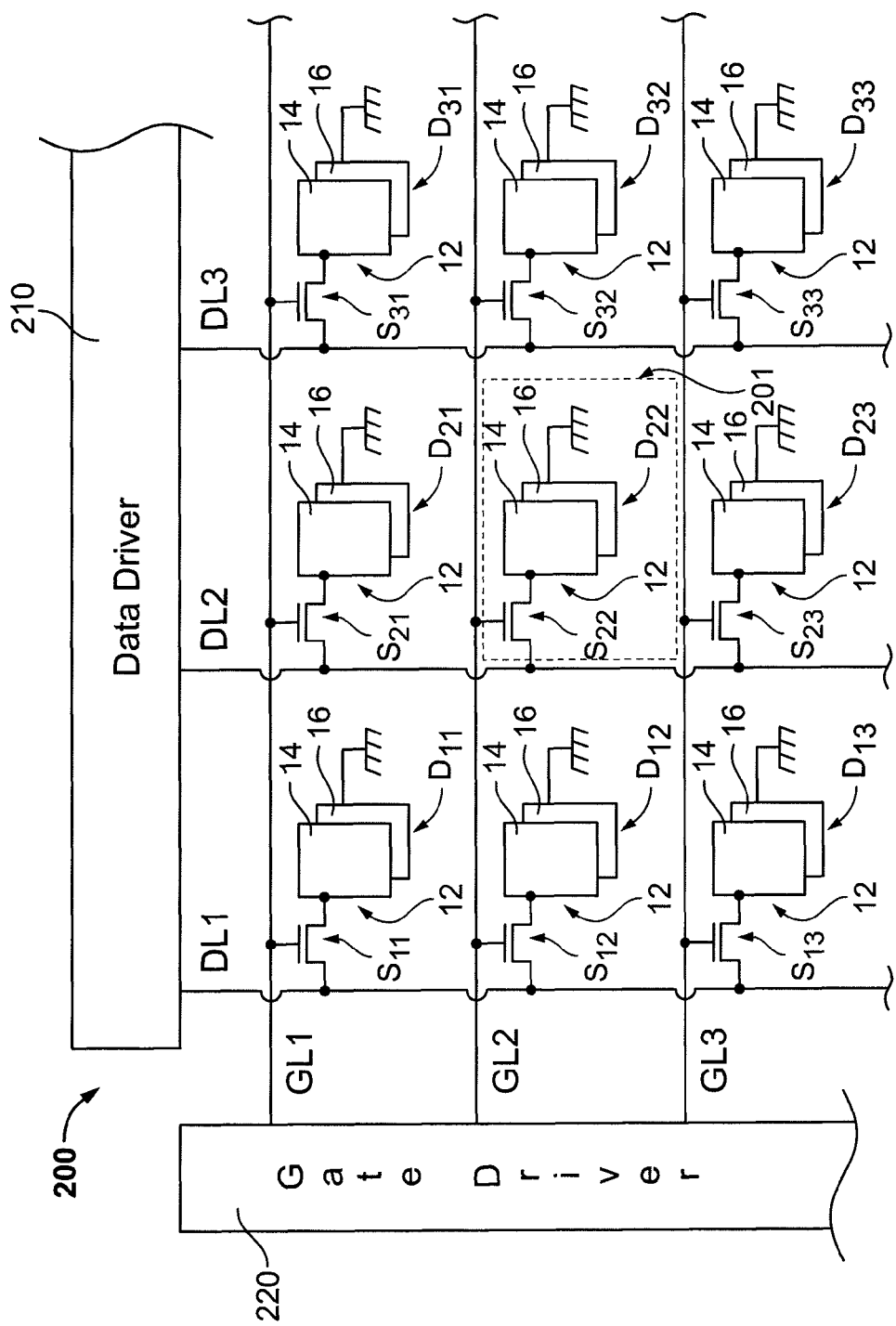
FIG. 2 shows an example of a schematic circuit diagram illustrating a driving circuit array for an optical MEMS display device.

FIG. 2 shows an example of a schematic circuit diagram illustrating a driving circuit array 200 for an optical MEMS display device. The driving circuit array 200 can be used for implementing an active matrix addressing scheme for providing image data to display elements $D_{11}$-$D_{mn}$ of a display array assembly.

The driving circuit array 200 includes a data driver 210, a gate driver 220, first to m-th data lines DL1-DLm, first to n-th gate lines GL1-GLn, and an array of switches or switching circuits $S_{11}$-$S_{mn}$. Each of the data lines DL1-DLm extends from the data driver 210, and is electrically connected to a respective column of switches $S_{11}$-$S_{1n}$, $S_{21}$-$S_{2n}$, ..., $S_{m1}$-$S_{mn}$. Each of the gate lines GL1-GLn extends from the gate driver 220, and is electrically connected to a respective row of switches $S_{11}$-$S_{m1}$, $S_{12}$-$S_{m2}$, ..., $S_{1n}$-$S_{mn}$. The switches $S_{11}$-$S_{mn}$ are electrically coupled between one of the data lines DL1-DLm and a respective one of the display elements $D_{11}$-$D_{mn}$ and receive a switching control signal from the gate driver 220 via one of the gate lines GL1-GLn. The switches $S_{11}$-$S_{mn}$ are illustrated as single FET transistors, but may take a variety of forms such as two transistor transmission gates (for current flow in both directions) or even mechanical MEMS switches.

The data driver 210 can receive image data from outside the display, and can provide the image data on a row by row basis in a form of voltage signals to the switches $S_{11}$-$S_{mn}$ via the data lines DL1-DLm. The gate driver 220 can select a particular row of display elements $D_{11}$-$D_{m1}$, $D_{12}$-$D_{m2}$, ..., $D_{1n}$-$D_{mn}$ by turning on the switches $S_{11}$-$S_{m1}$, $S_{12}$-$S_{m2}$, ..., $S_{1n}$-$S_{mn}$ associated with the selected row of display elements $D_{11}$-$D_{m1}$, $D_{12}$-$D_{m2}$, ..., $D_{1n}$-$D_{mn}$. When the switches $S_{11}$-$S_{m1}$, $S_{12}$-$S_{m2}$, ..., $S_{1n}$-$S_{mn}$ in the selected row are turned on, the image data from the data driver 210 is passed to the selected row of display elements $D_{11}$-$D_{m1}$, $D_{12}$-$D_{m2}$, ..., $D_{1n}$-$D_{mn}$.

During operation, the gate driver 220 can provide a voltage signal via one of the gate lines GL1-GLn to the gates of the switches $S_{11}$-$S_{mn}$ in a selected row, thereby turning on the switches $S_{11}$-$S_{mn}$. After the data driver 210 provides image data to all of the data lines DL1-DLm, the switches $S_{11}$-$S_{mn}$ of the selected row can be turned on to provide the image data to the selected row of display elements $D_{11}$-$D_{m1}$, $D_{12}$-$D_{m2}$, ..., $D_{1n}$-$D_{mn}$, thereby displaying a portion of an image. For example, data lines DL that are associated with pixels that are to be actuated in the row can be set to, e.g., 10-volts (could be positive or negative), and data lines DL that are associated with pixels that are to be released in the row can be set to, e.g., 0-volts. Then, the gate line GL for the given row is asserted, turning the switches in that row on, and applying the selected data line voltage to each pixel of that row. This charges and actuates the pixels that have 10-volts applied, and discharges and releases the pixels that have 0-volts applied. Then, the switches $S_{11}$-$S_{mn}$ can be turned off. The display elements $D_{11}$-$D_{m1}$, $D_{12}$-$D_{m2}$, ..., $D_{1n}$-$D_{mn}$ can hold the image data because the charge on the actuated pixels will be retained when the switches are off, except for some leakage through insulators and the off state switch. Generally, this leakage is low enough to retain the image data on the pixels until another set of data is written to the row. These steps can be repeated to each succeeding row until all of the rows have been selected and image data has been provided thereto. In the implementation of FIG. 2, the lower electrode 16 is grounded at each pixel. In some implementations, this may be accomplished by depositing a continuous optical stack 16 onto the substrate and grounding the entire sheet at the periphery of the deposited layers. FIG. 3 is an example of a schematic partial cross-section illustrating one implementation of the structure of the driving circuit and the associated display element of FIG. 2.

FIG. 3 shows an example of a schematic partial cross-section illustrating one implementation of the structure of the driving circuit and the associated display element of FIG. 2. The portion 201 of the driving circuit array 200 includes the switch $S_{22}$ at the second column and the second row, and the associated display element $D_{22}$. In the illustrated implementation, the switch $S_{22}$ includes a transistor 80. Other switches in the driving circuit array 200 can have the same configuration as the switch $S_{22}$.

FIG. 3 also includes a portion of a display array assembly 110, and a portion of a backplate 120. The portion of the display array assembly 110 includes the display element $D_{22}$ of FIG. 2. The display element $D_{22}$ includes a portion of a front substrate 20, a portion of an optical stack 16 formed on the front substrate 20, supports 18 formed on the optical stack 16, a movable electrode 14/34 supported by the supports 18, and an interconnect 126 electrically connecting the movable electrode 14/34 to one or more components of the backplate 120.

The portion of the backplate 120 includes the second data line DL2 and the switch $S_{22}$ of FIG. 2, which are embedded in the backplate 120. The portion of the backplate 120 also includes a first interconnect 128 and a second interconnect 124 at least partially embedded therein. The second data line DL2 extends substantially horizontally through the backplate 120. The switch $S_{22}$ includes a transistor 80 that has a source 82, a drain 84, a channel 86 between the source 82 and the drain 84, and a gate 88 overlying the channel 86. The transistor 80 can be a thin film transistor (TFT) or metal-oxide-semiconductor field effect transistor (MOSFET). The gate of the transistor 80 can be formed by gate line GL2 extending through the backplate 120 perpendicular to data line DL2. The first interconnect 128 electrically couples the second data line DL2 to the source 82 of the transistor 80.

The transistor 80 is coupled to the display element $D_{22}$ through one or more vias 160 through the backplate 120. The vias 160 are filled with conductive material to provide electrical connection between components (for example, the display element $D_{22}$) of the display array assembly 110 and components of the backplate 120. In the illustrated implementation, the second interconnect 124 is formed through the via 160, and electrically couples the drain 84 of the transistor 80 to the display array assembly 110. The backplate 120 also can include one or more insulating layers 129 that electrically insulate the foregoing components of the driving circuit array 200.

As shown in FIG. 3, the display element $D_{22}$ can be an interferometric modulator that has a first terminal coupled to the transistor 80, and a second terminal coupled to a common electrode that can be formed by at least part of an optical stack 16. The optical stack 16 of FIG. 3 is illustrated as three layers, a top dielectric layer described above, a middle partially reflective layer (such as chromium) also described above, and a lower layer including a transparent conductor (such as indium-tin-oxide (ITO)). The common electrode is formed by the ITO layer and can be coupled to ground at the periphery of the display.

Figure 4:
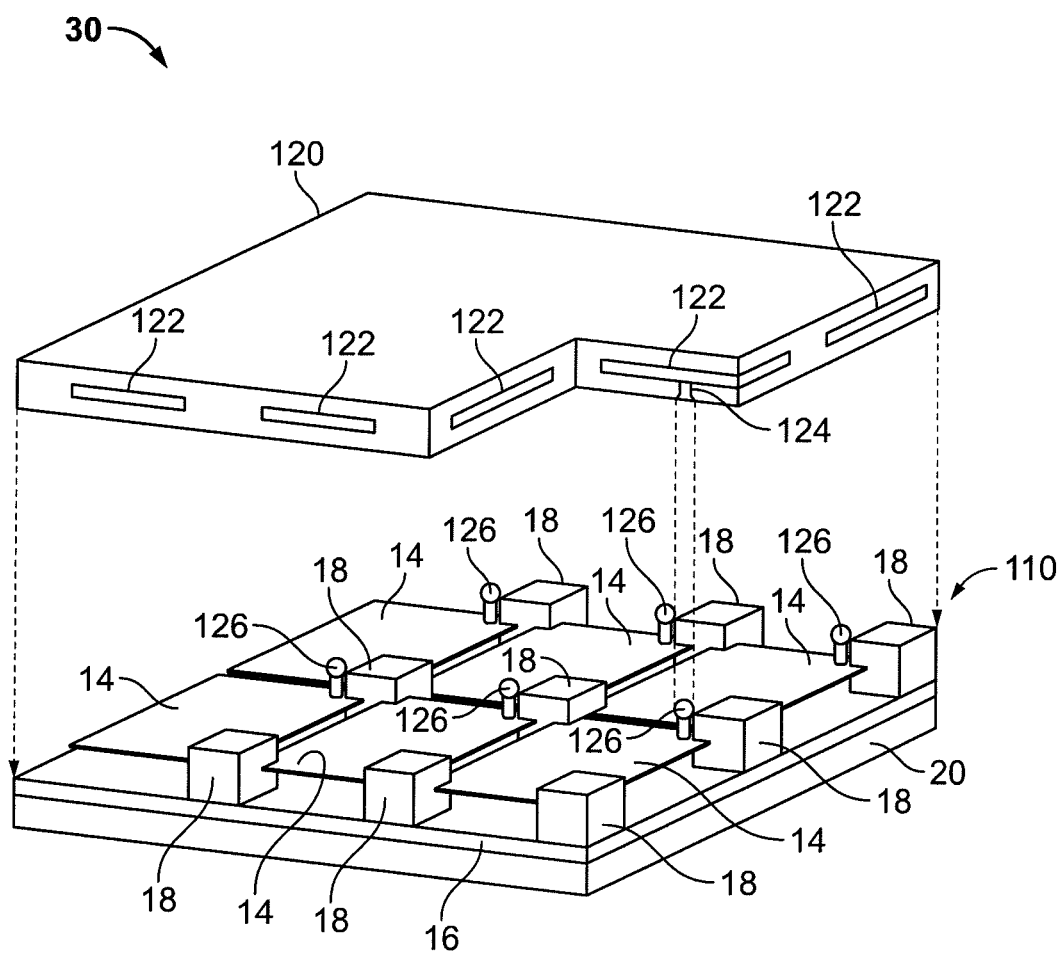
FIG. 4 shows an example of a schematic exploded partial perspective view of an optical MEMS display device having an interferometric modulator array and a backplate with embedded circuitry.

FIG. 4 shows an example of an exploded partial perspective view of an optical MEMS display device 30 having an interferometric modulator array and a backplate with embedded circuitry. The display device 30 includes a display array assembly 110 and a backplate 120. In some implementations, the display array assembly 110 and the backplate 120 can be separately pre-formed before being attached together. In some other implementations, the display device 30 can be fabricated in any suitable manner, such as, by forming components of the backplate 120 over the display array assembly 110 by deposition.

The display array assembly 110 can include a front substrate 20, an optical stack 16, supports 18, movable electrodes 14, and interconnects 126. The backplate 120 includes backplate components 122 at least partially embedded therein, and one or more backplate interconnects 124.

The optical stack 16 of the display array assembly 110 can be a substantially continuous layer covering at least the array region of the front substrate 20. The optical stack 16 can include a substantially transparent conductive layer that is electrically connected to ground. The movable electrodes 14/34 can be separate plates having, e.g., a square or rectangular shape. The movable electrodes 14/34 can be arranged in a matrix form such that each of the movable electrodes 14/34 can form part of a display element. In the implementation of FIG. 4, the movable electrodes 14/34 are supported by the supports 18 at four corners.

Each of the interconnects 126 of the display array assembly 110 serves to electrically couple a respective one of the movable electrodes 14/34 to one or more backplate components 122. In the illustrated implementation, the interconnects 126 of the display array assembly 110 extend from the movable electrodes 14/34, and are positioned to contact the backplate interconnects 124. In another implementation, the interconnects 126 of the display array assembly 110 can be at least partially embedded in the supports 18 while being exposed through top surfaces of the supports 18. In such an implementation, the backplate interconnects 124 can be positioned to contact exposed portions of the interconnects 126 of the display array assembly 110. In yet another implementation, the backplate interconnects 124 can extend to and electrically connect to the movable electrodes 14 without actual attachment to the movable electrodes 14, such as the interconnects 126 of FIG. 4.

In addition to the bistable interferometric modulators described above, which have a relaxed state and an actuated state, interferometric modulators may be designed to have a plurality of states. For example, an analog interferometric modulator (AIMOD) may have a range of color states. In one AIMOD implementation, a single interferometric modulator can be actuated into, e.g., a red state, a green state, a blue state, a black state, or a white state. Accordingly, a single interferometric modulator may be configured to have various states with different light reflectance properties over a wide range of the optical spectrum. The optical stack of an AIMOD may differ from the bi-stable display elements described above. These differences may produce different optical results. For example, in the bi-stable elements described above, the closed state gives the bi-stable element a black reflective state. An analog interferometric modulator, however, may have a white reflective state when the electrodes are in a similar position to the closed state of the bi-stable element.

Figure 5:
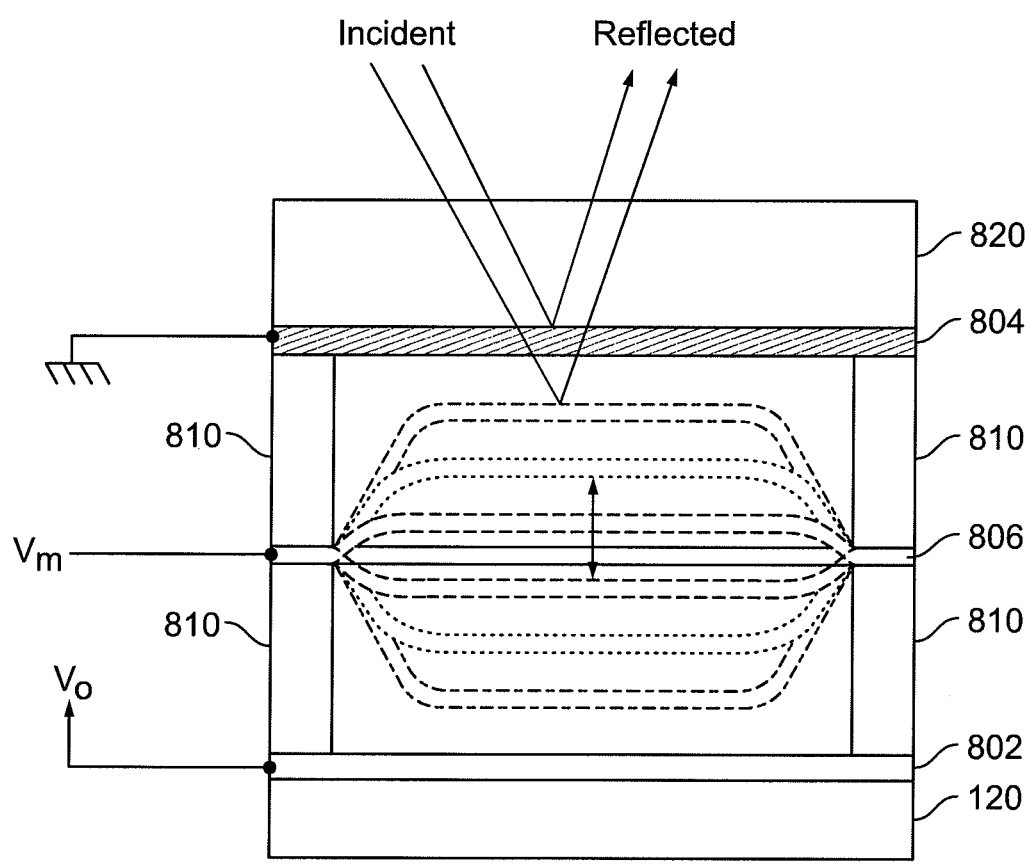
FIG. 5 shows a cross-section of an implementation of an interferometric modulator having two fixed layers and a movable third layer.

FIG. 5 shows a cross-section of an interferometric modulator having two fixed layers and a movable third layer. Specifically, FIG. 5 shows an implementation of an analog interferometric modulator having a fixed first layer 802, a fixed second layer 804, and a movable third layer 806 positioned between the fixed first and second layers 802 and 804. Each of the layers 802, 804, and 806 may include an electrode or other conductive material. For example, the first layer 802 may include a plate made of metal. Each of the layers 802, 804, and 806 may be stiffened using a stiffening layer formed on or deposited on the respective layer. In one implementation, the stiffening layer includes a dielectric. The stiffening layer may be used to keep the layer to which it is attached rigid and substantially flat. Some implementations of the modulator 800 may be referred to as a three-terminal interferometric modulator.

The three layers 802, 804, and 806 are electrically insulated by insulating posts 810. The movable third layer 806 is suspended from the insulating posts 810. The movable third layer 806 is configured to deform such that the movable third layer 806 may be displaced in a generally upward direction toward the first layer 802, or may be displaced in a generally downward direction toward to the second layer 804. In some implementations, the first layer 802 also may be referred to as the top layer or top electrode. In some implementations, the second layer 804 also may be referred to as the bottom layer or bottom electrode. The interferometric modulator 800 may be supported by a substrate 820.

In FIG. 5, the movable third layer 806 is illustrated as being in an equilibrium position with the solid lines. As illustrated in FIG. 5, a fixed voltage difference may be applied between the first layer 802 and the second layer 804. In this implementation, a voltage $V_0$ is applied to layer 802 and layer 804 is grounded. If a variable voltage $V_m$ is applied to the movable third layer 806, then as that voltage $V_m$ approaches $V_0$, the movable third layer 806 will be electrostatically pulled toward grounded layer 804. As that voltage $V_m$ approaches ground, the movable third layer 806 will be electrostatically pulled toward layer 802. If a voltage at the midpoint of these two voltages ($V_0/2$ in this implementation) is applied to movable third layer 806, then the movable third layer 806 will be maintained in its equilibrium position indicated with solid lines in FIG. 5. By applying a variable voltage to the movable third layer 806 that is between the voltages on the outer layers 802 and 804, the movable third layer 806 can be positioned at a desired location between the outer layers 802 and 804, producing a desired optical response. The voltage difference $V_0$ between the outer layers can vary widely depending on the materials and construction of the device, and in many implementations may be in the range of about 5-20 volts. It also may be noted that as the movable third layer 806 moves away from this equilibrium position, it will deform or bend. In such deformed or bent configuration, an elastic spring force mechanically biases the movable third layer 806 toward the equilibrium position. This mechanical force also contributes to the final position of the movable third layer 806 when a voltage V is applied there.

The movable third layer 806 may include a mirror to reflect light entering the interferometric modulator 800 through substrate 820. The mirror may include a metal material. The second layer 804 may include a partially absorbing material such that the second layer 804 acts as an absorbing layer. When light reflected from the mirror is viewed from the side of the substrate 820, the viewer may perceive the reflected light as a certain color. By adjusting the position of the movable third layer 806, certain wavelengths of light may be selectively reflected.

Figure 6:
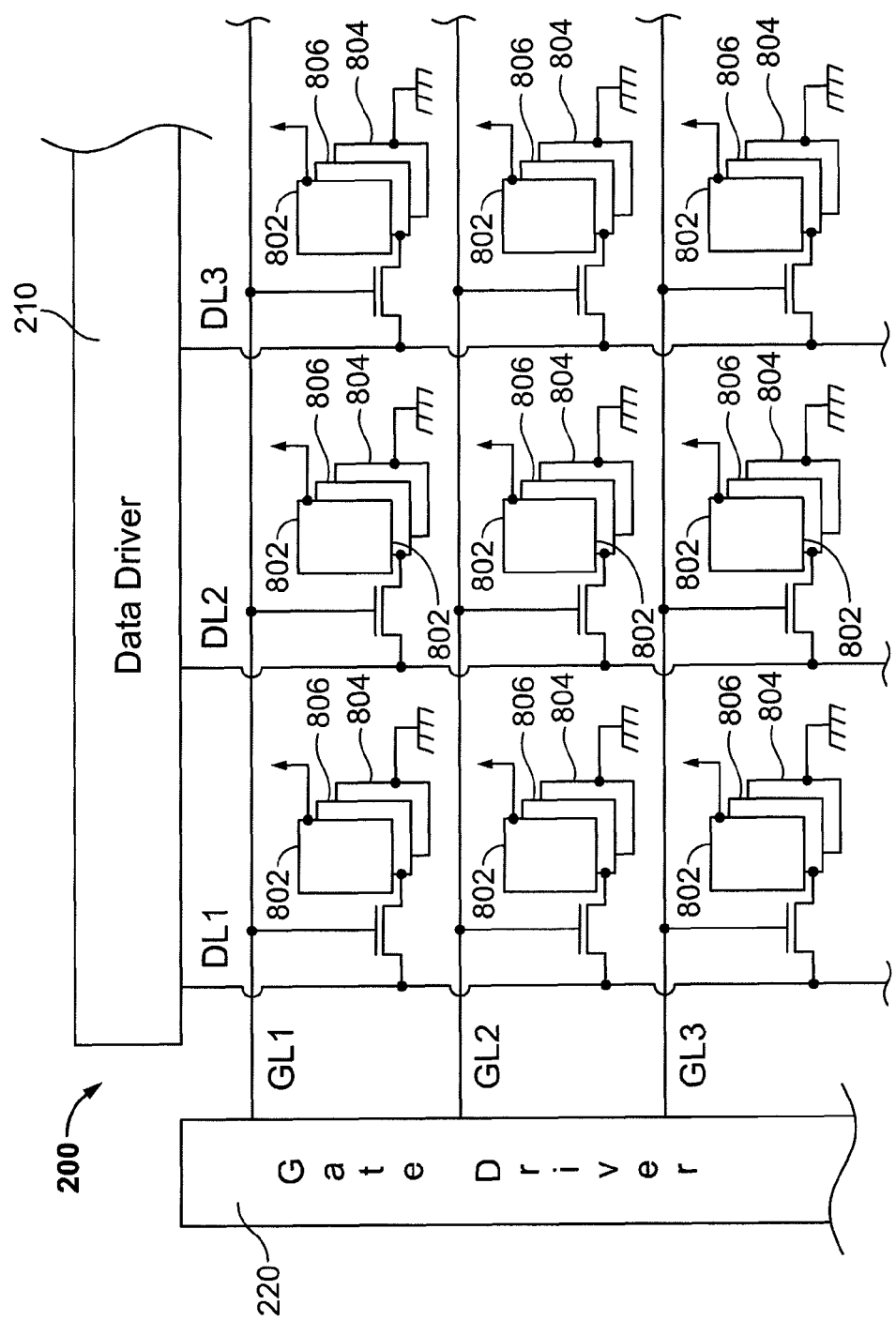
FIG. 6 shows an example of a schematic circuit diagram illustrating a driving circuit array for an optical MEMS display device having the structure of FIG. 5.

FIG. 6 shows an example of a schematic circuit diagram illustrating a driving circuit array for an optical EMS display device having the structure of FIG. 5. The overall apparatus shares many similarities to the structure of FIG. 2 that uses the bistable interferometric modulators. As shown in FIG. 6, however, an additional upper layer 802 is provided for each display element. This upper layer 802 may be deposited on the underside of the backplate 120 shown in FIGS. 3 and 4, and may have a voltage $V_0$ applied thereto. These implementations are driven in a manner similar to that described above with reference to FIG. 2, except the voltages provided on the data lines DL1-DLn can be placed at a range of voltages between $V_0$ and ground, rather than at one of only two different voltages. In this way, the movable third layers 806 of the display elements along a row each can be independently placed in any particular desired position between the upper and lower layers when the row is written by asserting the gate line for that particular row.

Figure 7A:
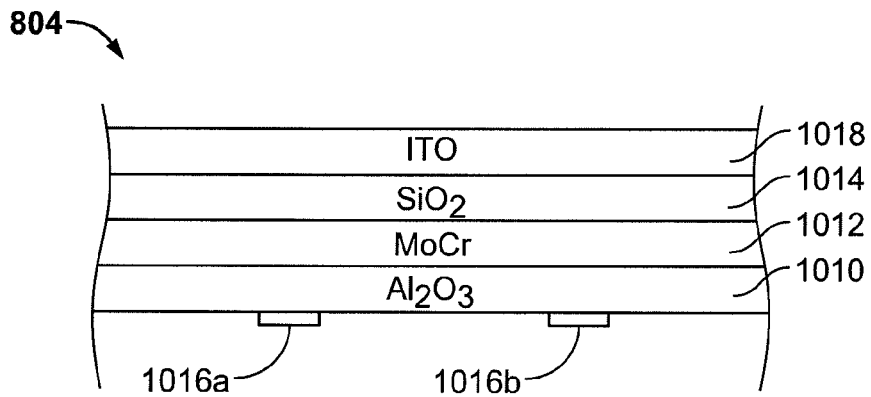
FIGS. 7A-7C shows cross-sections of the two fixed layers and the movable layer of the interferometric modulator of FIG. 5 illustrating stacks of materials.
Figure 7B:
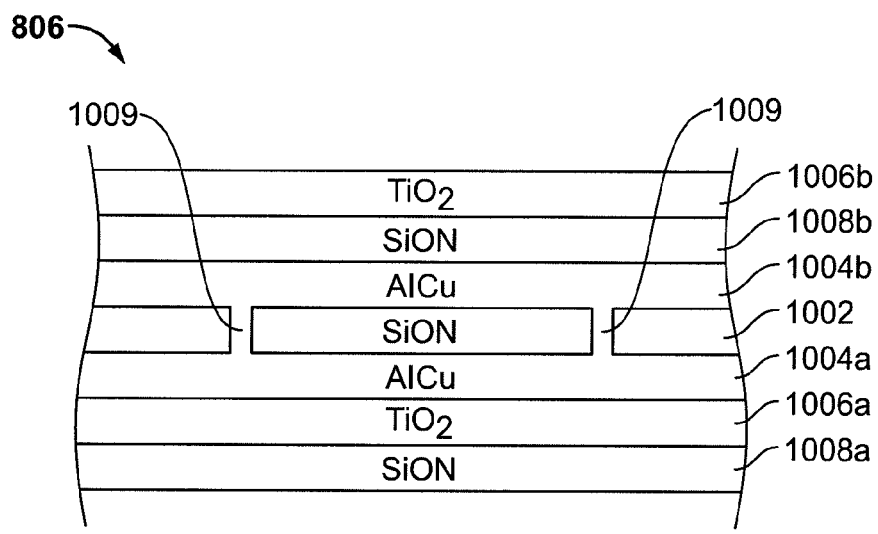
Figure 7C:
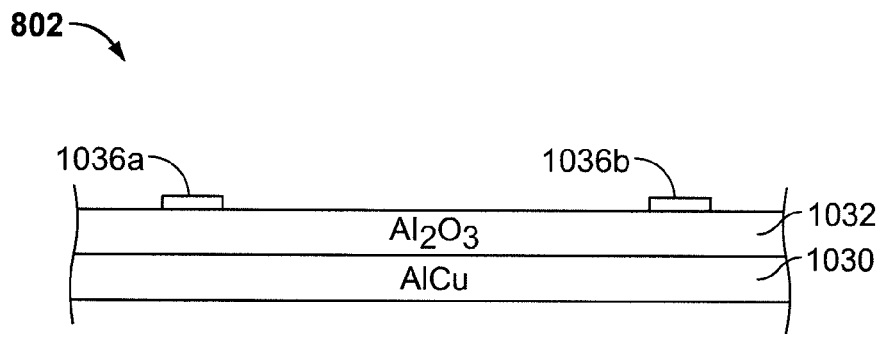

FIGS. 7A-7C show cross-sections of the two fixed layers and the movable layer of the interferometric modulator of FIG. 5 illustrating stacks of materials.

In the implementation illustrated in FIGS. 7A and 7B, the movable third layer 806 and the second layer 804 each include a stack of materials. For example, the movable third layer 806 includes a stack including silicon oxynitride (SiON), aluminum-copper (AlCu), and titanium dioxide (TiO$_2$). The second layer 804, for example, includes a stack including silicon oxynitride (SiON), aluminum oxide (Al$_2$O$_3$), molybdenum-chromium (MoCr), and silicon dioxide (SiO2).

In the illustrated implementation, the movable third layer 806 includes a SiON substrate 1002 having an AlCu layer 1004a deposited thereon. In this implementation, the AlCu layer 1004a is conductive and may be used as an electrode. In some implementations, the AlCu layer 1004 provides reflectivity for light incident thereon. In some implementations, the SiON substrate 1002 is approximately 500 nm thick, and the AlCu layer 1004a is approximately 50 nm thick. A TiO$_2$ layer 1006a is deposited on the AlCu layer 1004a, and in some implementations the TiO$_2$ layer 1006a is approximately 26 nm thick. An SiON layer 1008a is deposited on the TiO$_2$ layer 1006a, and in some implementations the SiON layer 1008a is approximately 52 m thick. The refractive index of the TiO$_2$ layer 1006a is greater than the refractive index of the SiON layer 1008a. Forming a stack of materials with alternating high and low refractive indices in this way may cause light incident on the stack to be reflected, thereby acting substantially as a mirror.

As can be seen in FIG. 7B, the movable third layer 806 may in some implementations include an additional AlCu layer 1004b, an additional TiO$_2$ layer 1006b, and an additional SiON layer 1008b formed on the side of the SiON substrate 1002 opposite the AlCu layer 1004a, TiO$_2$ layer 1006a, and SiON layer 1008a. Forming the layers 1004b, 1006b, and 1008b may weight the movable third layer 806 approximately equally on each side of the SiON substrate 1002, which may increase the positional accuracy and stability of the movable third layer 806 when translating the movable third layer 806. In such implementations, a via 1009 or other electrical connection may be formed between the AlCu layers 1004a and 1004b such that the voltage of the two AlCu layers 1004a and 1004b will remain substantially equal. In this way, when a voltage is applied to one of these two layers, the other of these two layers will receive the same voltage. Additional vias (not shown) may be formed between the AlCu layers 1004a and 1004b.

In the implementation illustrated in FIG. 7A, the second layer 804 includes a SiO$_2$ substrate 1010 having an MoCr layer 1012 formed thereon. In this implementation, the MoCr layer 1012 may act as a discharge layer to discharge accumulated charge, and may be coupled to a transistor to selectively effect the discharge. The MoCr layer 1012 also may serve as an optical absorber. In some implementations, the MoCr layer 1012 is approximately 5 nm thick. An Al$_2$O$_3$ layer 1014 is formed on the MoCr layer 1012, and may provide some reflectance of light incident thereon and may also serve as a bussing layer in some implementations. In some implementations, the Al$_2$O$_3$ layer 1014 is approximately 9 nm thick. One or more SiON stops 1016a and 1016b may be formed on the surface of the Al$_2$O$_3$ layer 1014. These stops 1016 mechanically prevent the movable third layer 806 from contacting the Al$_2$O$_3$ layer 1014 of the second layer 804 when the movable third layer 806 is deflected fully towards the second layer 804. This may reduce stiction and snap-in of the device. Further, an electrode layer 1018 may be formed on the SiO$_2$ substrate 1010, as shown in FIG. 7. The electrode layer 1018 may include any number of substantially transparent electrically conductive materials, with indium tin oxide being one suitable material.

Layer 802 illustrated in FIG. 7C can be made with simple structure as it has few optical and mechanical requirements it must fulfill. This layer may include a conductive layer of AlCu 1030 and an insulating $Al_2O_3$ layer 1032. As with layer 804, one or more SiON stops 1036a and 1036b may be formed on the surface of the $Al_2O_3$ layer 1032.

Figure 8:
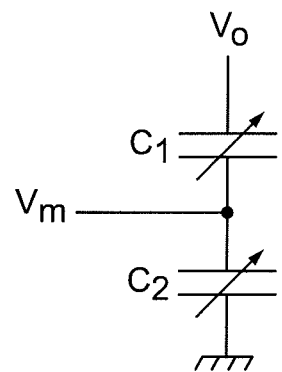
FIG. 8 shows a schematic representation of the interferometric modulator and a voltage source illustrated in FIG. 5.

FIG. 8 shows a schematic representation of the interferometric modulator and voltage sources illustrated in FIG. 5. In this schematic, the modulator is coupled to the voltage sources $V_0$ and $V_m$. Those of skill in the art will appreciate that the gap between the first layer 802 and the movable third layer 806 forms a capacitor $C_1$ having a variable capacitance, while the gap between the movable third layer 806 and the second layer 804 forms a capacitor $C_2$ also having a variable capacitance. Thus, in the schematic representation illustrated in FIG. 8, the voltage source $V_0$ is connected across the series coupled variable capacitors $C_1$ and $C_2$, while the voltage source $V_m$ is connected between the two variable capacitors $C_1$ and $C_2$.

Figure 9:
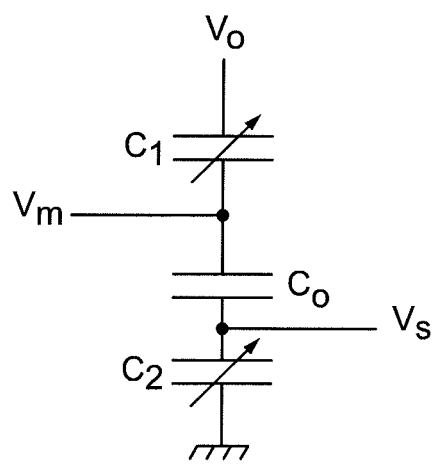
FIG. 9 shows a schematic representation of an interferometric modulator with an isolated electrode portion used for position sensing.
Figure 10:
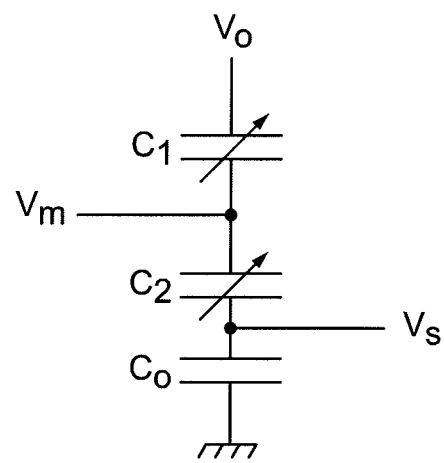
FIG. 10 shows a schematic representation of another interferometric modulator with an isolated electrode portion used for position sensing.

Accurately driving the movable third layer 806 to different positions using the voltage sources $V_0$ and $V_m$ as described above, however, may be difficult with many configurations of the interferometric modulator 800 because the relationship between voltage applied to the interferometric modulator 800 and the position of the movable third layer 806 may be highly non-linear. Further, applying the same voltage $V_m$ to the movable layers of different interferometric modulators may not cause the respective movable layers to move to the same position relative to the top and bottom layers of each modulator due to manufacturing differences, for example, variations in thickness or elasticity of the movable third layers 806 over the entire display surface. As the position of the movable layer will determine what color is reflected from the interferometric modulator, as discussed above, it is advantageous to be able to detect the position of the movable layer and to accurately drive the movable layer to desired positions. FIGS. 9 and 10 show schematic representations of modulator designs that allow such sensing and control.

FIG. 9 shows a schematic representation of an interferometric modulator with an isolated electrode portion used for position sensing. In the device of FIG. 9, a fixed capacitor $C_0$ is formed by two separated plates positioned on the movable third layer. The drive voltage $V_m$ is applied to one of the plates, and a sense voltage $V_s$ is detected on the other. As with the device illustrated in the schematic of FIG. 8, the modulator is coupled to the voltage source $V_0$ across the upper and lower layers 802 and 804. The gap between the first layer 802 and one plate of movable third layer 806 forms a capacitor $C_1$ having a variable capacitance, while the gap between the other plate of movable third layer 806 and the second layer 804 forms a capacitor $C_2$ also having a variable capacitance. This implementation is described further below with reference to FIGS. 11, 12, and 15.

FIG. 10 shows a schematic representation of another interferometric modulator with an isolated electrode portion used for position sensing. In this implementation, a fixed capacitor $C_0$ may be provided externally to the interferometric modulator structure, and the sense voltage $V_s$ can be detected from layer 804, where layer 804 is connected to one side of the external capacitor $C_0$. In the implementation of FIG. 10, the voltage source $V_0$ is connected across the upper layer 802 and the other side of the external capacitor. This implementation is described further below with reference to FIGS. 13, 14, and 16.

Figure 11:
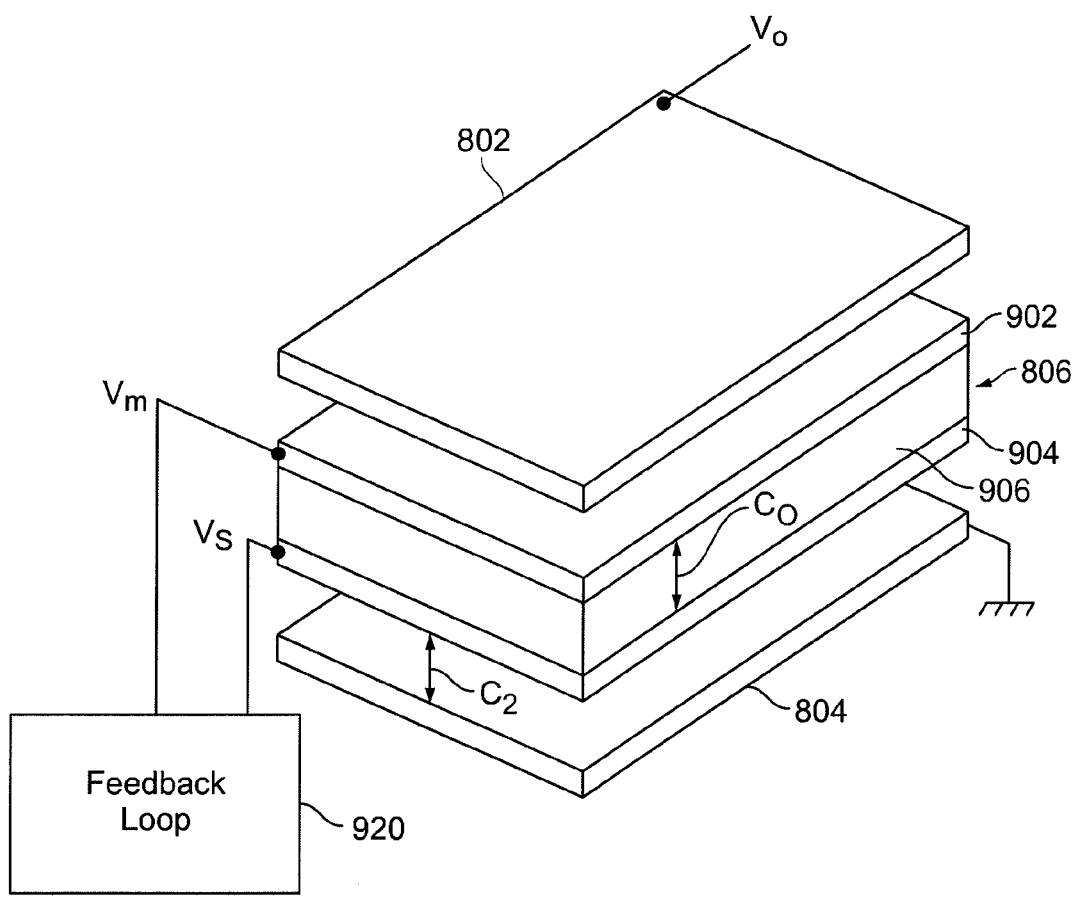
FIG. 11 shows a perspective conceptual view of an interferometric modulator having an isolated voltage sensing electrode on a movable middle layer.

FIG. 11 shows a perspective conceptual view of an interferometric modulator having an isolated voltage sensing electrode on a movable middle layer. The implementation shown in FIG. 11 has a schematic representation as shown in FIG. 9. Specifically, FIG. 11 shows an implementation of an interferometric modulator having the fixed second layer 804 (or 16), and the movable third layer 806 (or 14), as illustrated in FIGS. 5 (and 1A). FIG. 11, however, shows the movable layer 806 as being separated into a first electrode 902 and a second electrode 904 which are capacitively coupled to each other. In some aspects, the first electrode 902 and the second electrode 904 are capacitively coupled through a dielectric 906 between the first electrode 902 and the second electrode 904. In some aspects, such as when the modulator 900 has an analog interferometric modulator, the fixed layer 802 may also be included.

The movable layer 806 illustrated in FIG. 11 may be formed similar to the movable layer 806 illustrated in FIG. 7B, except that the vias 1009 are omitted. In this way, the first electrode 902 may be formed by the AlCu layer 1004b and the second electrode 904 may be formed by the AlCu layer 1004a. Similarly, the dielectric 906 may be formed by the SiON substrate 1002. Additional materials may be deposited on the movable layer 806 as illustrated in FIG. 7B.

Due to the first electrode 902 being mechanically coupled to the second electrode 904, as illustrated in FIG. 11, driving the first electrode 902 with the voltage source $V_m$ will cause the second electrode 904 to move along with the rest of the movable layer 806. A different voltage will be induced in second electrode 904 at each different position to which it is moved. This induced voltage can be sensed or detected as a voltage $V_s$.

The position of the movable layer 806 illustrated in FIG. 11 may be determined by measuring the voltage $V_s$. The circuit illustrated in FIG. 9 operates as a voltage divider and the voltage $V_s$ will be generated according to the following equation:

$$V_s = V_m * C_0/(C_2 + C_0) \quad (1)$$

where $V_m$ in equation (1) is used to represent the voltage supplied by the voltage source $V_m$, and $C_2$ and $C_0$ in equation (1) are used to represent the capacitances of the capacitors $C_2$ and $C_0$, respectively. The capacitance of $C_2$ may be determined using a distance G of the gap between the second electrode 904 and the fixed layer 804, as follows:

$$C_2 = A\epsilon_0/G \quad (2)$$

where A is the area of the first electrode 902 which overlaps with the fixed layer 804, and $\epsilon_0$ is the dielectric constant. Therefore, the sensed voltage follows the following equation:

$$V_s = \left( \frac{C_0}{\frac{A\epsilon_0}{G} + C_0} \right) V_m \quad (3)$$

The gap distance G, and thus the position of the movable layer 806 may therefore be determined from the sensed voltage $V_s$, the applied voltage $V_m$, the capacitance of the two layers on the movable layer 806, and the area of the movable layer 806. In some aspects, the sensed voltage $V_s$ and/or the determined position may be used as feedback to adjust the driving voltage $V_m$, in order to place the movable layer 806 at a desired position. For example, the sensed voltage $V_s$ may be input to a feedback circuit 920 which can use the sensed voltage to adjust the applied voltage $V_m$ to correct the position of the first electrode 902, and therefore the position of the movable third layer 806. In some aspects, the measured gap may be periodically or continuously compared to a desired or intended gap.

Figure 12:
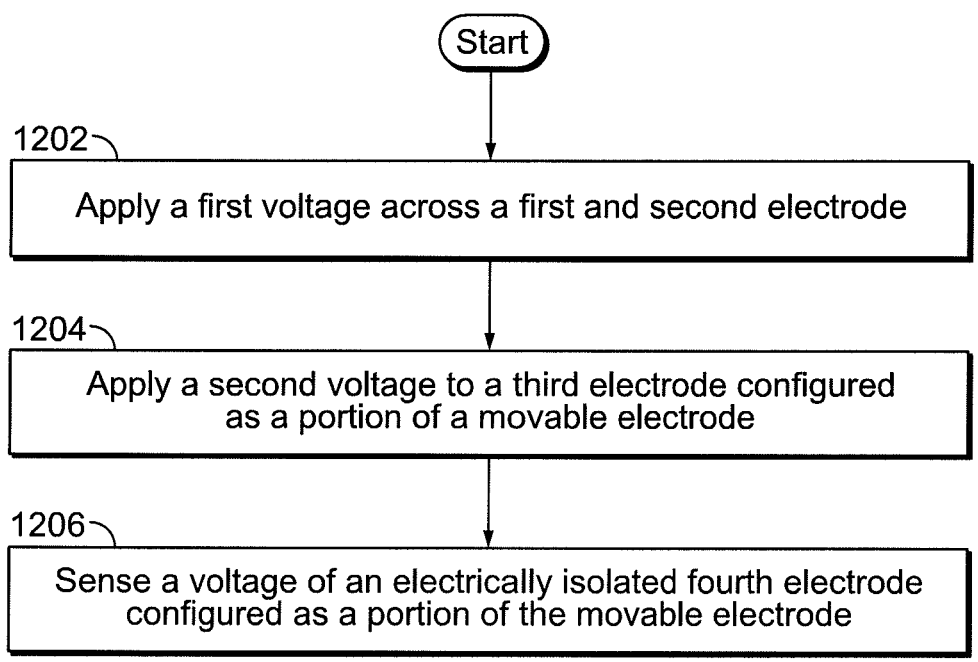
FIG. 12 shows a flowchart of a process for determining a position of an electrode disposed between two other electrodes.

FIG. 12 shows a flowchart of a process for determining a position of an electrode disposed between two other electrodes. A person of ordinary skill in the art will appreciate that the process may include additional or fewer steps than illustrated in FIG. 12.

At block 1202, a first voltage is applied across a first electrode and second electrode. This may correspond to the application of $V_0$ across layers 802 and 804 of FIG. 11. At block 1204, a second voltage is applied to a third electrode, where the third electrode is configured as part of a movable electrode. For example, the voltage source $V_m$, may be used to apply a voltage to the electrode 902 of the interferometric modulator. This may cause the movable layer 806 to move with respect to fixed electrodes 802 and 804. At step 1206, a voltage is sensed at a fourth electrode that is also configured as a portion of the movable electrode. For example, the voltage $V_s$ may be sensed from the electrode 904. As described above, a position of the movable layer may be determined based at least in part on the sensed voltage. The voltage $V_s$ may be used in a feedback circuit to control the second voltage in some implementations for positioning of the movable layer 806 in a desired position. In addition to closing the feedback loop, the sensed voltages may be collected as measurement data to allow calibrating the display device for subsequent data writing operations. For example, data on desired position, voltage applied, and position reached may be collected. As more data is gathered, information about the actual position vs. voltage of the device becomes available and may be subsequently used to apply corrected voltages for subsequent operation of the display device.

Figure 13:
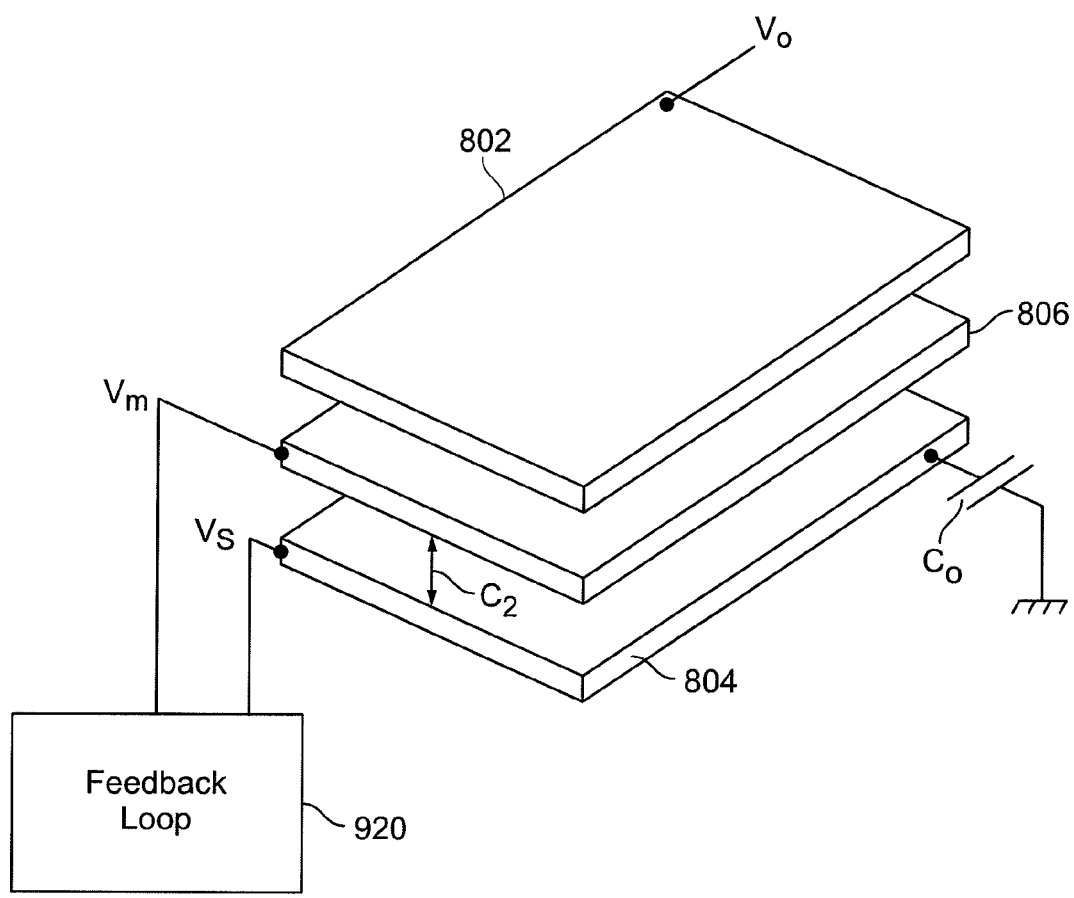
FIG. 13 shows a perspective conceptual view of an interferometric modulator having an isolated voltage sensing electrode on a fixed layer.

FIG. 13 shows a perspective conceptual view of an interferometric modulator having an isolated voltage sensing electrode on a fixed layer. Specifically, FIG. 13 shows an implementation of an interferometric modulator having the fixed first layer 802, fixed second layer 804 (or 16), and the movable third layer 806 (or 14). In contrast to FIG. 11, the movable third layer 806 is a single electrode (for example as shown in FIG. 7B with the vias 1009 present), not two separate parallel electrodes. The electrode of the movable third layer 806 is coupled to the voltage source $V_m$ in FIG. 13. In FIG. 13, an external capacitor $C_0$ is electrically connected between the fixed layer 804 and ground. In some aspects, the capacitor $C_0$ is in series with a floating absorber layer. For example, the capacitor $C_0$ may be coupled to the MoCr layer 1012 illustrated in FIG. 7A.

As discussed above, the gap between the movable layer 806 and the fixed layer 804 forms the variable capacitor $C_2$. Thus, the capacitor $C_2$ is connected in series with the capacitor $C_0$. When the movable layer 806 is displaced, a voltage $V_s$ may be sensed at the fixed layer 804, for example at a floating absorber of the fixed layer 804 as discussed above.

The position of the movable layer 806 illustrated in FIG. 13 may be determined by measuring the voltage $V_s$. The circuit illustrated in FIG. 13 operates as a voltage divider and the voltage $V_s$ will be generated according to the following equation:

$$V_s = V_m C_2 / (C_2 + C_0) \quad (4)$$

where $V_m$ in equation (4) is used to represent the voltage supplied by the voltage source $V_m$ and $C_2$ and $C_0$ in equation (4) are used to represent the capacitances of the capacitors $C_2$ and $C_0$ of FIGS. 10 and 13.

As discussed above, the capacitance of $C_2$ may be determined using a distance G of the gap between the movable layer 806 and the fixed layer 804 according to equation (2). Therefore, the sensed voltage may be determined by the following equation:

$$V_s = \left( \frac{\frac{A\varepsilon_0}{G}}{\frac{A\varepsilon_0}{G} + C_0} \right) V_m \quad (5)$$

The position of the movable layer 806 may thus be determined from the sensed voltage $V_s$, the applied voltage $V_m$, the capacitance of the fixed capacitor $C_0$, and the area of the movable layer 806. In some aspects, the sensed voltage $V_s$ and/or the determined position may be used as an input to feedback loop 920 to adjust the driving voltage $V_m$, as discussed above with respect to FIG. 11.

Figure 14:
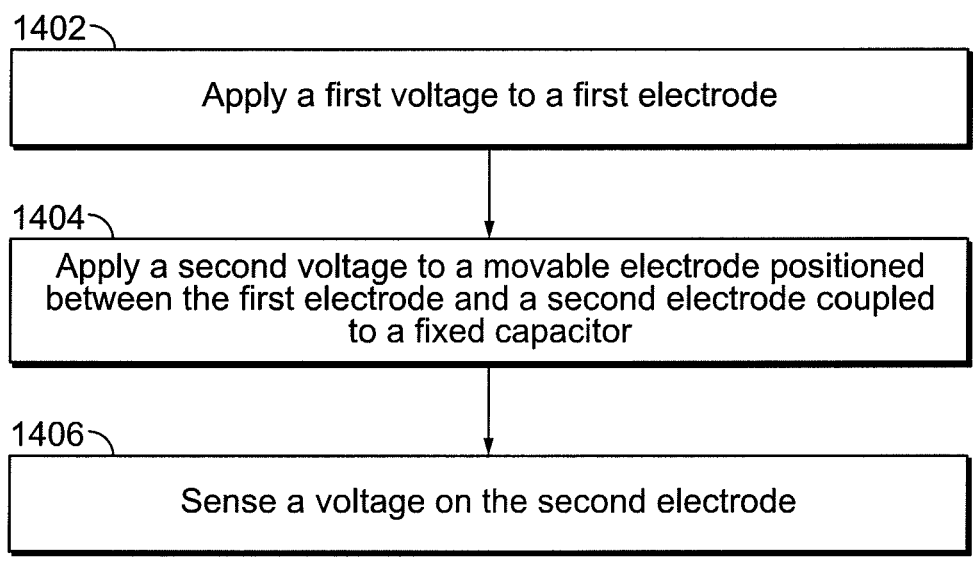
FIG. 14 shows a flowchart of a process for placing an electrode disposed between two other electrodes at a desired position.

FIG. 14 shows a flowchart of a process for placing an electrode disposed between two other electrodes at a desired position. At block 1402, a first voltage is applied to a first electrode. This may correspond to the application of $V_0$ to layer 802 of FIG. 13. At block 1404, a second voltage is applied to a movable electrode positioned between the first electrode and a second electrode coupled to a fixed capacitor. For example, the voltage source $V_m$ may be used to apply a voltage to the electrode forming the movable layer 806 of the interferometric modulator. The second electrode may correspond to the electrode 804, which is coupled to one side of a capacitor $C_0$. In some implementations, the capacitor $C_0$ is a fixed capacitor. At step 1406, a voltage is sensed at the second electrode. For example, the voltage $V_s$ may be sensed from the electrode 804. As described above, a position of the movable layer may be determined based at least in part on the sensed voltage. The voltage $V_s$ may be used in a feedback circuit to control the second voltage in some implementations for positioning of the movable layer 806 in a desired position, and may also be used to collect data for calibration purposes as described above.

Figure 15:
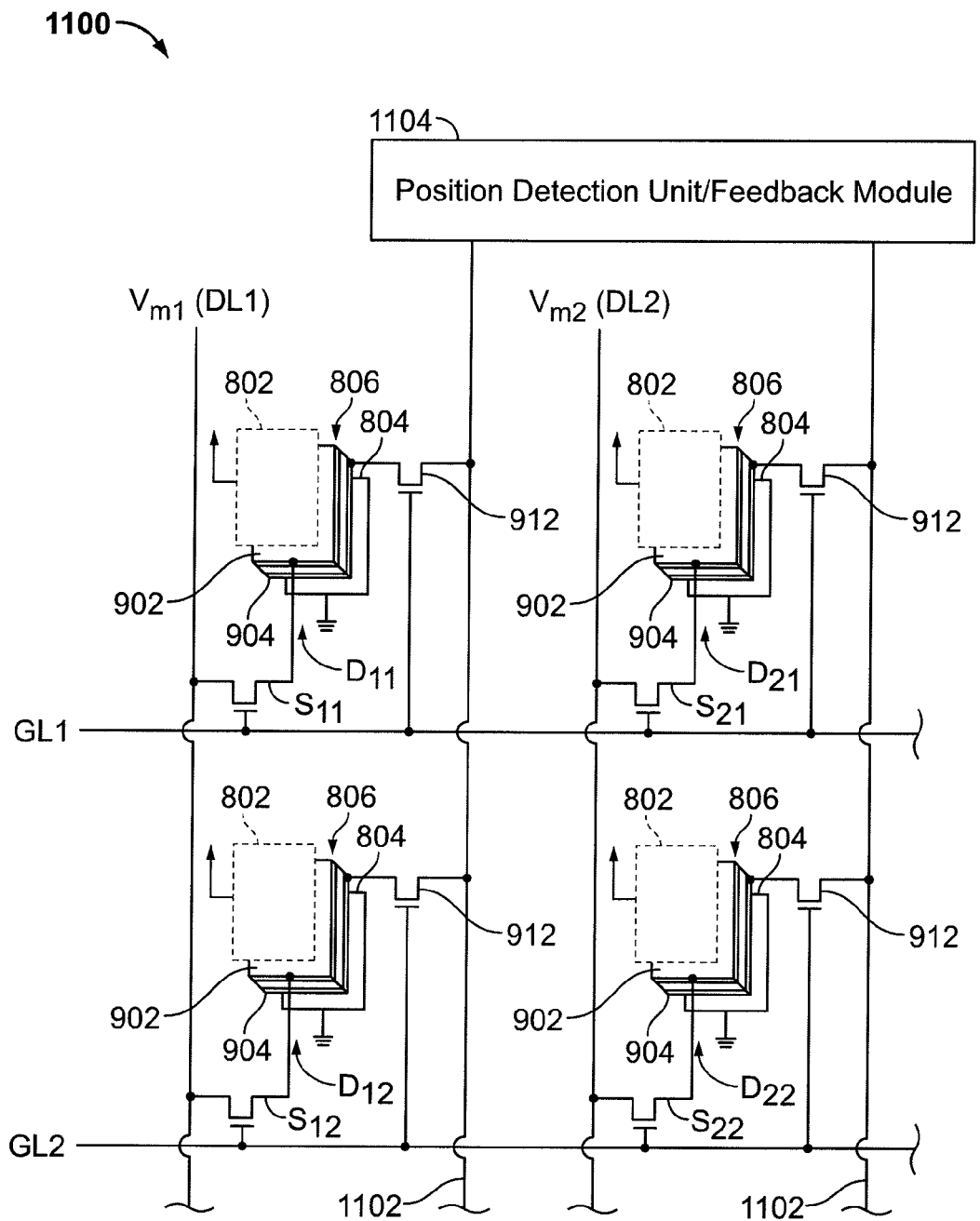
FIG. 15 is a diagram illustrating an array of interferometric modulators of the design illustrated in FIG. 11 incorporating voltage sensing.

FIG. 15 is a diagram illustrating an array of interferometric modulators of the design illustrated in FIG. 11 incorporating voltage sensing. In the aspect illustrated in FIG. 15, each of the interferometric modulators is illustrated as a display element $D_{11}$-$D_{mn}$ configured similar to the interferometric modulator illustrated in FIG. 11. As described above with respect to FIGS. 2 and 6, a data driver circuit (not shown) supplies a row of data voltages $V_{m1}$ through $V_{mn}$. A gate driver circuit (not shown) provides row select voltages GL1 through GLn that apply a set of data voltages to a selected row of display elements. In the aspect illustrated in FIG. 15, the electrode 904 of each interferometric modulator in a column is connected to a bus 1102 through a transistor 912 having a gate coupled to the respective row gate line for the row. The bus 1102 is configured to carry the voltage induced in the electrode 904 to a voltage sensor within the position detection unit/feedback module 1104. In the illustrated aspect, the position detection unit/feedback module 1104 includes a voltage sensor. The position detection unit/feedback module 1104 may be configured to determine a gap size between the movable layer 806 and the fixed layer 804, for example according to equations (1)-(3) discussed above.

To set the positions of the display elements in row 1, for example, the $V_{m1}$ through $V_{mn}$ outputs are set according to the desired position of each movable layer 806 along the row. When each $V_m$ for a row is appropriately set, gate line GL1 is asserted, causing the movable layers 806 to be set by connecting the voltages $V_m$ applied to the data lines to the respective electrodes 902 of the movable layers 806. Gate line GL1 assertion also causes the sensed voltage $V_s$ for each display element along the first row to be fed to the voltage sensor 1104 through transistor 921 which also has its gate connected to the gate line. In some aspects, the voltage sensor within the position detection unit/feedback module 1104 feeds an offset voltage back to the driver circuit (such as driver circuit 210 in FIG. 2) generating one or more of the $V_{m1}$ through $V_{mn}$ outputs to adjust a position of the movable layer 806. In some aspects, the driver circuit 210 adjusts one or more of the $V_{m1}$ through $V_{mn}$ outputs based on an estimated position of the movable layer 806 received from the voltage sensor within the position detection unit/feedback module 1104. The adjustment may be performed while the display elements along row 1 are still being set, or may be applied during the next period when row 1 is set. The process of setting the display elements $D_{11}$-$D_{mn}$ is repeated for each row to complete the process of writing a full frame of image data.

As discussed above, the drive transistors $S_{11}$ through $S_{mn}$ may be incorporated into the backplate 120 shown in FIG. 3. Similarly, the voltage sensor within the position detection unit/feedback module 1104 or a portion thereof may be incorporated into the backplate 120. In some aspects, the voltage sensor 1104 is implemented separate from the backplate. A person of ordinary skill in the art will appreciate that not all interferometric modulators need share a common voltage sensor. In some aspects, a plurality of voltage sensors are used. For example, each column may have its own voltage sensor, or one or more interferometric modulators in the array 1100 may have its own voltage sensor.

Figure 16:
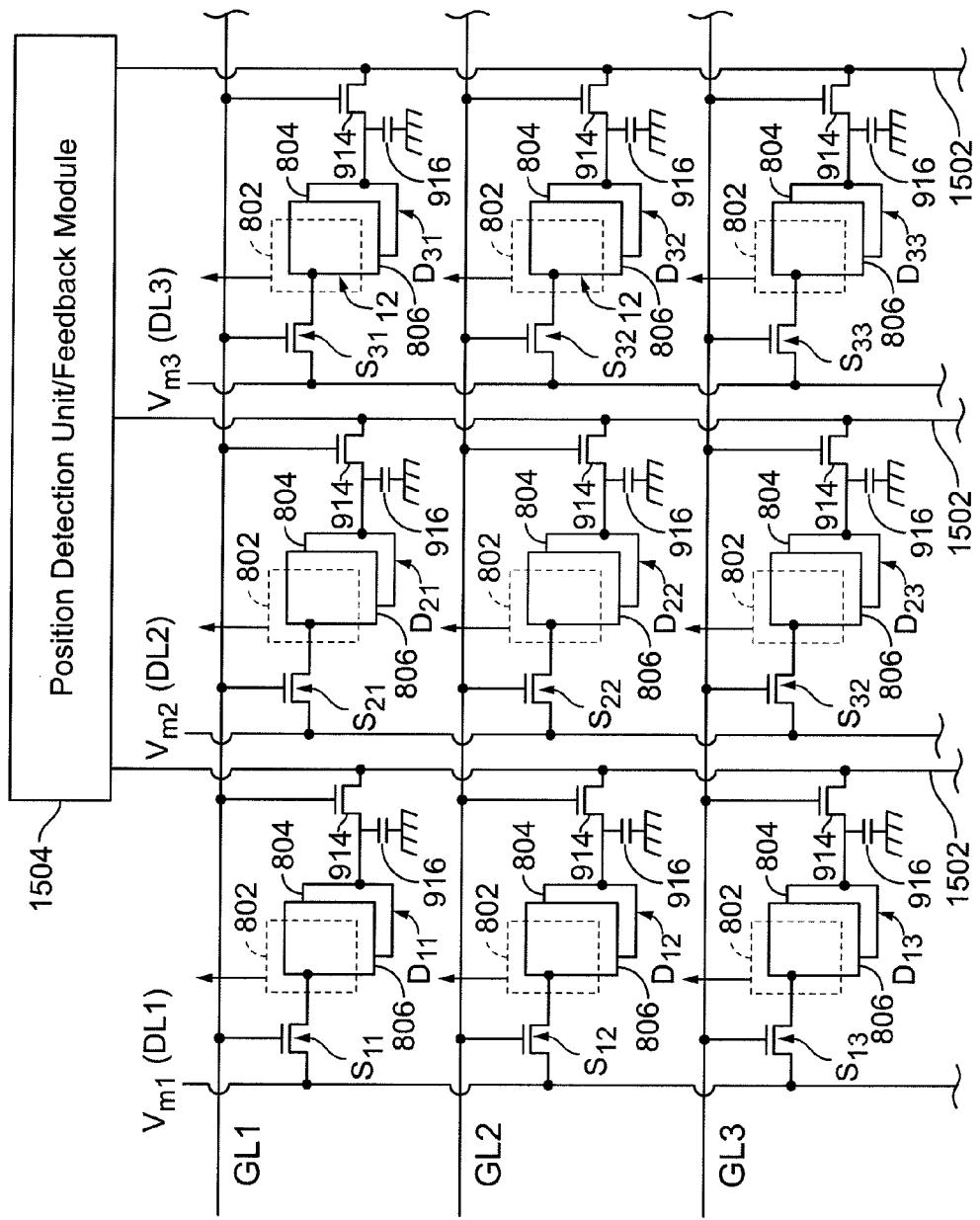
FIG. 16 is a diagram illustrating an array of interferometric modulators of the design illustrated in FIG. 13 incorporating voltage sensing.

FIG. 16 is a diagram illustrating an array of interferometric modulators of the design illustrated in FIG. 13 incorporating voltage sensing. In the aspect illustrated in FIG. 16, each of the interferometric modulators is illustrates a display element $D_{11}$-$D_{mn}$ configured similar to the interferometric modulator illustrated in FIG. 13. As described above with respect to FIGS. 2 and 6, a data driver circuit supplies a row of data voltages $V_{m1}$ through $V_{mn}$. A gate driver circuit provides row select voltages GL1 through GLn that apply a set of data voltages to a selected row of display elements. In the aspect illustrated in FIG. 16, the fixed layer 804 of each interferometric modulator in a column is connected to a bus 1502 through a transistor 914 having a gate coupled to the respective row gate line for the row. The bus 1502 is configured to carry the voltage induced in the electrode 804 to a voltage sensor 1504. The electrode 804 is connected to one end of an external fixed capacitor 916, that has its other terminal connected to ground. In the illustrated aspect, the position detection unit/feedback module 1104 includes at least one voltage sensor. The position detection unit/feedback module 1504 may be configured to determine a gap size between the movable layer 806 and the fixed layer 804, for example according to equations (4)-(5) discussed above.

The interferometric modulators of each row in the array 1500 may be set as described above with respect to FIG. 15. The voltage sensor 1504 may feed an offset voltage back to one or more of the $V_{m1}$ through $V_{mn}$ outputs, and/or may provide an estimated position of the movable layer 806 to the driver 210.

The voltage sensor 1504 may be implemented on the backplate 120 shown in FIG. 3 or separate from the backplate 120, similarly to the voltage sensor 1104. Further, multiple voltage sensors may be used instead of a single voltage sensor.

Figure 17A:
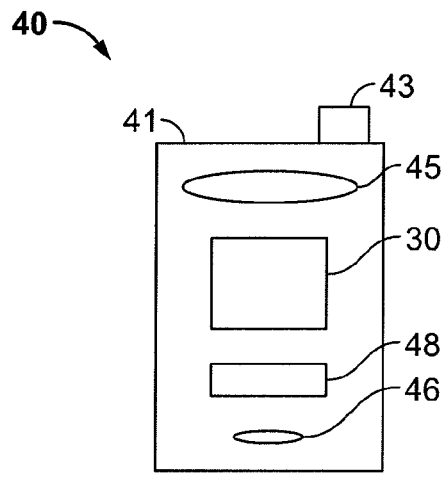
FIGS. 17A and 17B show examples of system block diagrams illustrating a display device that includes a plurality of interferometric modulators.
Figure 17B:
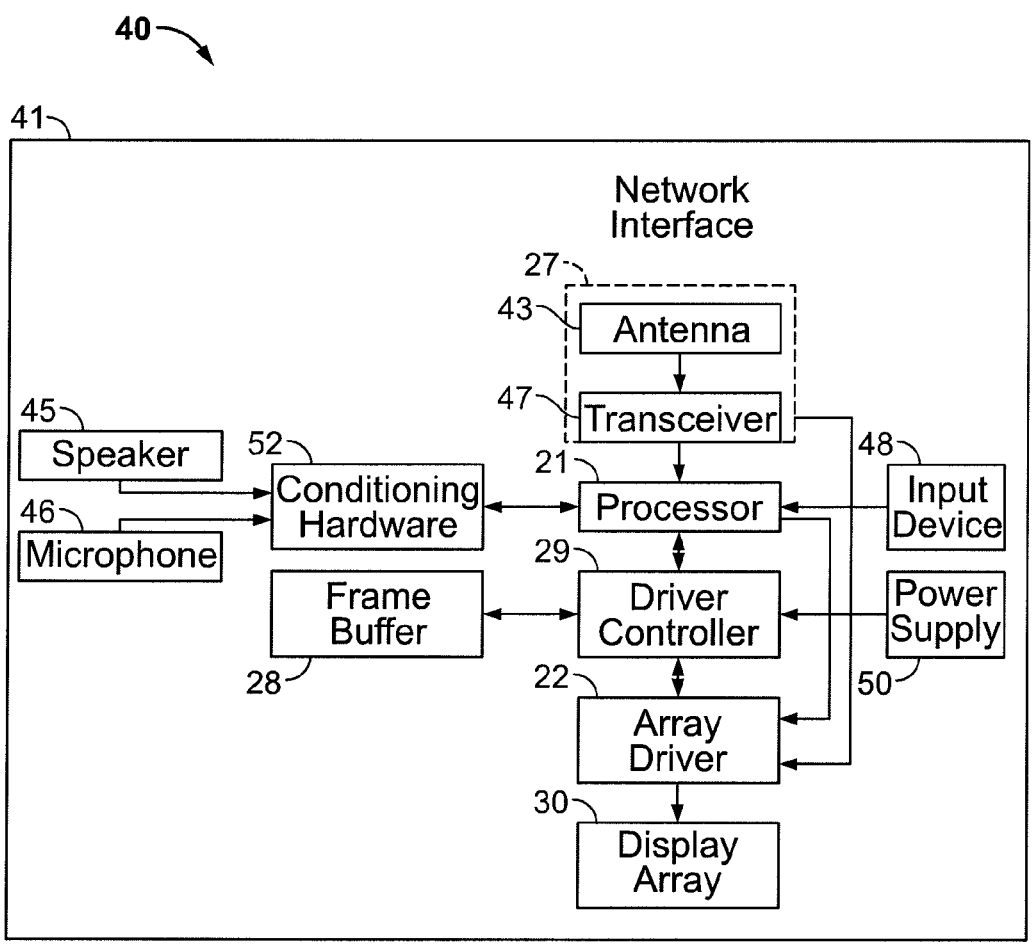

FIGS. 17A and 17B show examples of system block diagrams illustrating a display device 40 that includes a plurality of interferometric modulators. The display device 40 can be, for example, a smart phone, a cellular or mobile telephone. However, the same components of the display device 40 or slight variations thereof are also illustrative of various types of display devices such as televisions, tablets, e-readers, hand-held devices and portable media players.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 17B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (such as an IMOD controller). Additionally, the array driver 22 can be a conventional driver or a bi-stable display driver (such as an IMOD display driver). Moreover, the display array 30 can be a conventional display array or a bi-stable display array (such as a display including an array of IMODs). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

Figure 18:
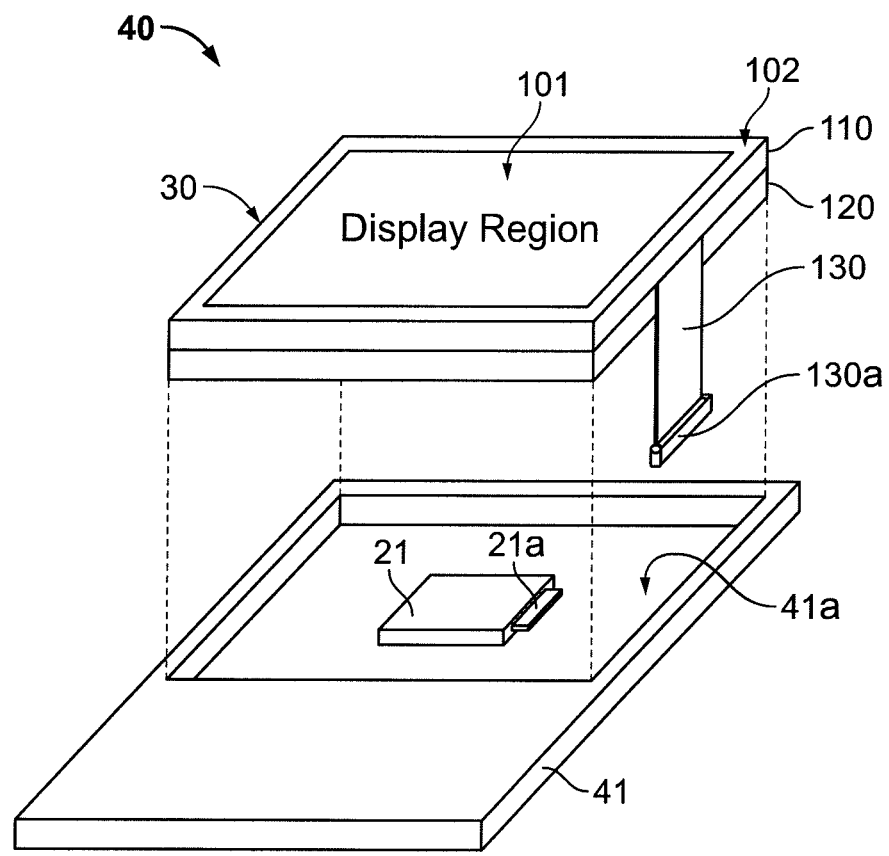
FIG. 18 is an example of a schematic exploded perspective view of an electronic device having an optical MEMS display.

FIG. 18 is an example of a schematic exploded perspective view of the electronic device having an optical MEMS display. The illustrated electronic device 40 includes a housing 41 that has a recess 41a for a display 30. The electronic device 40 also includes a processor 21 on the bottom of the recess 41a of the housing 41. The processor 21 can include a connector 21a for data communication with the display 30. The electronic device 40 also can include other components, at least a portion of which is inside the housing 41. The other components can include, but are not limited to, a networking interface, a driver controller, an input device, a power supply, conditioning hardware, a frame buffer, a speaker, and a microphone, as described earlier in connection with FIG. 16B.

The display 30 can include a display array assembly 110, a backplate 120, and a flexible electrical cable 130. The display array assembly 110 and the backplate 120 can be attached to each other, using, for example, a sealant.

The display array assembly 110 can include a display region 101 and a peripheral region 102. The peripheral region 102 surrounds the display region 101 when viewed from above the display array assembly 110. The display array assembly 110 also includes an array of display elements positioned and oriented to display images through the display region 101. The display elements can be arranged in a matrix form. In one implementation, each of the display elements can be an interferometric modulator. In some implementations, the term "display element" also may be referred to as a "pixel."

The backplate 120 may cover substantially the entire back surface of the display array assembly 110. The backplate 120 can be formed from, for example, glass, a polymeric material, a metallic material, a ceramic material, a semiconductor material, or a combination of two or more of the foregoing materials, in addition to other similar materials. The backplate 120 can include one or more layers of the same or different materials. The backplate 120 also can include various components at least partially embedded therein or mounted thereon. Examples of such components include, but are not limited to, a driver controller, array drivers (for example, a data driver and a scan driver), routing lines (for example, data lines and gate lines), switching circuits, processors (for example, an image data processing processor) and interconnects.

The flexible electrical cable 130 serves to provide data communication channels between the display 30 and other components (for example, the processor 21) of the electronic device 40. The flexible electrical cable 130 can extend from one or more components of the display array assembly 110, or from the backplate 120. The flexible electrical cable 130 includes a plurality of conductive wires extending parallel to one another, and a connector 130a that can be connected to the connector 21a of the processor 21 or any other component of the electronic device 40.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of an IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A device for modulating light, comprising:
a first electrode coupled to a first voltage source;
a second electrode;
a movable electrode disposed between and spaced apart from the first electrode and the second electrode, the movable electrode including a third electrode and a fourth electrode, the third electrode and the fourth electrode being capacitively coupled, the third electrode and the fourth electrode being positioned in two different parallel planes separated by a gap;
a voltage sensor coupled to the third electrode; and
a second voltage source coupled to the fourth electrode, wherein the second electrode is coupled to a third voltage source.

2. The device of claim 1, wherein the voltage sensor provides feedback for the second voltage source.

3. The device of claim 1, wherein the movable electrode includes a mirror layer.

4. The device of claim 3, wherein the second electrode includes a partially reflective layer.

5. The device of claim 1, wherein the first voltage source includes a substantially fixed voltage source and the third voltage source is ground.

6. The device of claim 1, wherein the second voltage source includes a variable voltage source.

7. The device of claim 6, further including a drive circuit configured to adjust a position of the movable electrode by varying the voltage supplied by the second voltage source.

8. The device of claim 7, wherein the drive circuit is coupled to a first bus connected to one or more voltage sensors of other devices for modulating light.

9. A display system, comprising the device of claim 1, further comprising:
  a display;
  a processor that is configured to communicate with the display, the processor being configured to process image data; and
  a memory device that is configured to communicate with the processor.

10. The apparatus as recited in claim 9, further comprising:
  a driver circuit configured to send at least one signal to the display; and
    a controller configured to send at least a portion of the image data to the driver circuit.

11. The apparatus as recited in claim 9, further comprising:
  an image source module configured to send the image data to the processor.

12. The apparatus as recited in claim 11, wherein the image source module includes at least one of a receiver, transceiver, and transmitter.

13. The apparatus as recited in claim 9, further comprising:
  an input device configured to receive input data and to communicate the input data to the processor.

14. A method of driving a device for modulating light, comprising:
  applying a first voltage across a first electrode and a second electrode;
  applying a second voltage to a third electrode in a first plane configured as a portion of a movable electrode, the movable electrode being disposed between and spaced apart from the first electrode and the second electrode and including a fourth electrode capacitively coupled to the third electrode that is positioned in a second different and parallel plane as the third electrode and separated from the third electrode by a gap; and
  sensing a voltage of the fourth electrode.

15. The method of claim 14, wherein the movable electrode is displaced in response to the applying the second voltage.

16. The method of claim 15, wherein the sensed voltage is used to adjust the applied second voltage until the offset of the movable electrode is substantially equal to a desired offset.

17. A device for modulating light, comprising:
  means for applying a first voltage across a first electrode and a second electrode;
  means for applying a second voltage to a third electrode in a first plane configured as a portion of a movable electrode, the movable electrode being disposed between and spaced apart from the first electrode and the second electrode and including a fourth electrode capacitively coupled to the third electrode that is positioned in a second different and parallel plane as the third electrode and separated from the third electrode by a gap; and
  means for sensing a voltage of the fourth electrode.

18. The device of claim 17, additionally including means for determining a position of the movable electrode based at least in part on the sensed voltage.

\* \* \* \* \*